United States Patent

[11] 3,581,577

| [72] | Inventors | George A. Ray, Jr.;<br>John H. Von Dreele, both of Albuquerque, N. Mex. |
|---|---|---|
| [21] | Appl. No. | 803,155 |
| [22] | Filed | Feb. 28, 1969 |
| [45] | Patented | June 1, 1971 |
| [73] | Assignee | The United States of America as represented by the United States Atomic Energy Commission |

[54] ACCELERATION-SENSITIVE ACTUATOR
3 Claims, 5 Drawing Figs.

[52] U.S. Cl. ................................................. 73/492
[51] Int. Cl. .............................................. G01p 15/04
[50] Field of Search ........................................ 73/514–
—517, 492, 503; 200/61.45, 61.53

[56] References Cited
UNITED STATES PATENTS

| 2,979,582 | 4/1961 | Weaver | 73/503X |
| 3,101,002 | 8/1963 | Van Zyl et al. | 73/514 |
| 3,122,023 | 2/1964 | Gledhill | 73/503X |
| 3,226,504 | 12/1965 | Gallistel et al. | 200/61.53 |
| 3,233,464 | 2/1966 | Mol | 73/503X |

Primary Examiner—James J. Gill
Attorney—Roland A. Anderson

ABSTRACT: A device for sensing a level of acceleration lasting for a given time period and initiating a response thereto. An element movable in response to acceleration forces carries an actuator member and also a trigger mechanism that has a rotatable finger to normally hold the actuator member, actuation of the trigger mechanism being controlled by a cam that swings the finger after a predetermined movement.

PATENTED JUN 1 1971

3,581,577

INVENTORS
GEORGE A. RAY, JR.
JOHN H. VON DREELE
BY 3,581,577

ACCELERATION-SENSITIVE ACTUATOR

BACKGROUND OF INVENTION

There are many applications in industry, space and weapons for devices which may sense acceleration or deceleration, but which for convenience herein will generally be referred to as acceleration, and provide some indication or measure when the acceleration continues for some predetermined period. It is particularly difficult to provide such mechanisms which may be reliably and repeatably responsive to acceleration forces near the acceleration of gravity (i.e. about 1 $g$). Applications which may require this level of sensitivity include launching of rockets or space vehicles or on space vehicles which are just at the point of entering the fringe of a planetary atmosphere, such as earth. At this point, it may be desirable to automatically initiate some function, such as retrofire, or provide a warning signal to a ground station or to the vehicle itself. The change in atmosphere may initially cause a slight increase or decrease in vehicle velocity, that is an acceleration, as the density of the atmosphere changes. The initial acceleration will be quite small, beginning in the area of zero $g$'s and difficult of detection.

Where the acceleration or $g$'s are quite small, an acceleration-measuring device should be capable of detecting a velocity change while discriminating against normal vibrations or other extraneous movements which may accidentally activate the device.

Further, it is also desirable to provide an acceleration-actuated device which is readily adaptable to sense a wide range of acceleration levels without substantial modification of the device.

SUMMARY OF INVENTION

It is an object of this invention to provide an improved acceleration-responsive device It is a further object of this invention to provide a device which is activated upon a achieving a predetermined acceleration level continuing for a predetermined time period.

It is a further object of this invention to provide an acceleration-responsive device capable of sensing a wide range of acceleration levels beginning at about 1.5 $g$.

It is a further object of this invention to provide an acceleration-responsive device which will not be activated by extraneous changes in velocity of very short duration.

Various other objects and advantages will appear from the following description of one embodiment of the invention, and the most novel features will be particularly pointed out hereinafter in connection with the appended claims.

The invention comprises an acceleration responsive means movable upon subjection to acceleration forces above a predetermined level, an actuator member carried by said means and trigger and timing means for delaying said member until said acceleration-responsive means moves a desired distance.

DESCRIPTION OF DRAWINGS

The present invention is illustrated in the accompanying drawings, wherein.

DETAILED DESCRIPTION

Figure 1:
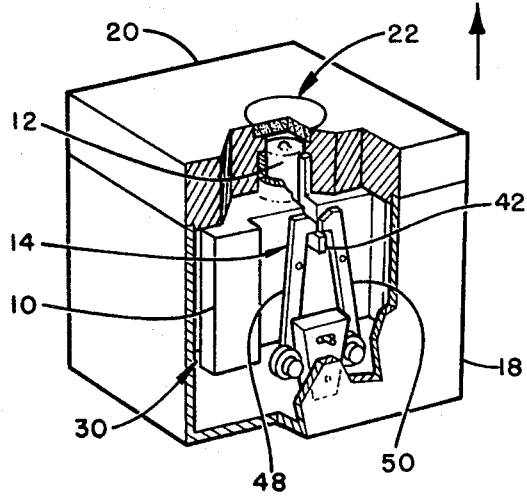
FIG. 1 is a partially cut away perspective view of an acceleration-responsive device of the present invention.

Described generally, an acceleration-measuring device embodying the present invention as shown in FIGS. 1—4 comprises an acceleration-responsive element or mass 10, an actuator member 12 carried by element 10, a trigger and locking mechanism 14 and a time-delaying or damping means 16, all suitably mounted within a cover or housing 18 which may be conventionally sealed and fastened to a base or end member 20 and operatively associated with a utilization device or means 22. Utilization device 22 may be energized or operated by actuator member 12 when the acceleration-measuring device is subjected to predetermined acceleration-time values, with a provision for automatic reset should the acceleration-responsive element be displaced by an unsustained acceleration such as may be produced by an instantaneous shock.

Housing 18 and base member 20 may be any convenient shape, size and material which will provide the desired support and protection of the various elements and mechanisms supported therein.

Acceleration-responsive element 10 may have any appropriate shape which may support and carry the other required elements or mechanisms associated therewith and adequate mass to respond to the levels of acceleration forces which it is to sense. Element 10 may be mounted within housing 18 on base member 20 by one or more bolts or rods 24 fastened between the housing and base member and passing through suitable bores or passageways 26 and 28 in element 10. Element 10 may be adapted to slide along bores 26 and 28 by conventional low-friction bearings or bushings such as ball bushings 30 and 32 in a well-known manner. Ball bushings 30 and 32 preferably have extremely low friction and free-moving elements under environments to which the device is to be subjected so as to insure and maintain the desired level of sensitivity. It may be desirable to form bore 28 in a generally U-shape, as shown, to permit some lateral or side movement of element 10 to compensate for any side loads to which it may be subjected or for any inaccuracies in manufacture which might cause the element to bind or inhibit its movement. Such side loads or inaccuracies may be extremely critical in a device which is sensitive to low $g$ forces.

Element 10 may also include a tubular guide 33 extending from the front face of element 10 into a suitable bore or opening 40 in base member 20. Bore 40 should be sized to permit ready movement of guide 33 therethrough so as not to impede the movement of element 10 while maintaining the element aligned with the utilization means 22.

Figure 5:
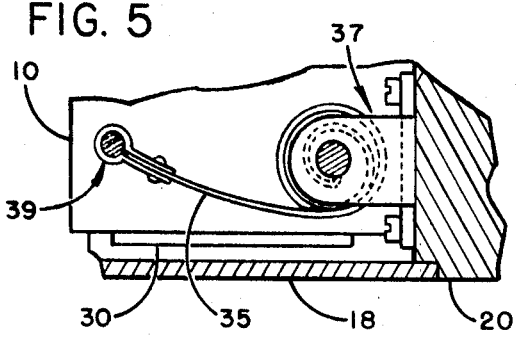
FIG. 5 is a partially cutaway fragmentary view of an alternate spring mechanism for biasing the acceleration-responsive element against accelerations.

A resilient means may be mounted between housing 18 or base member 20 and acceleration-responsive element 10 so as to urge or bias element 10 against or towards base member 20. A suitable resilient means may include coil springs 34 and 36 positioned between the end wall of housing 18 and the rearward face of element 10 and suitably mounted such as about bolts 24, as shown. In most applications, it is preferable that the resilient means, such as coil springs 34 and 36, exhibit or provide a generally constant or positive force function against element 10 so that the acceleration force level which is to be sensed may be selected by choosing the proper resilient means and to provide the desired reset function. For very low level $g$ forces, it may be desirable to utilize an essentially constant force coiled ribbon or spiral type spring 35, as shown in FIG. 5, mounted between convenient portions of element 10 and base member 20, such as between a suitable mount or fastener 37 on an inward wall or surface of base member 20 and a mounting means 39 on element 10.

Figure 3:
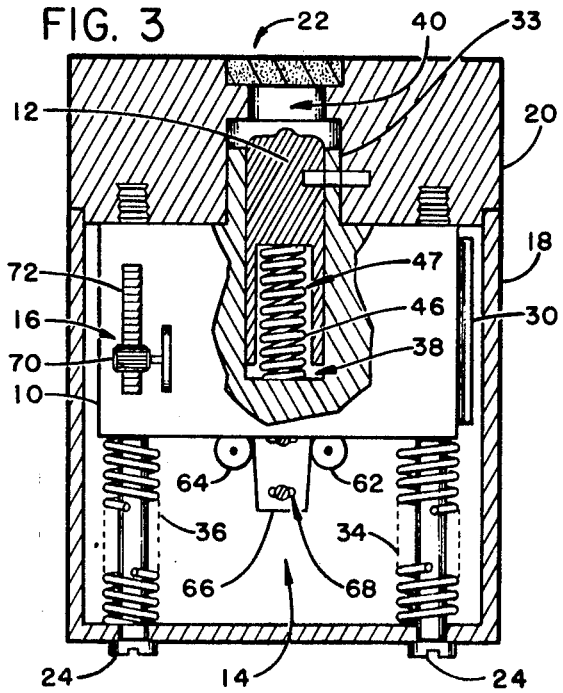
FIG. 3 is a partially cut away side view of the device of FIG. 2 taken along line 3-3 thereof.

Actuator member 12 may be positioned within guide 33 and a generally centrally located bore 38 of element 10 and aligned with the corresponding bore 40 in base member 20. Actuator member 12 may include a protruding pin or latch 42 extending therefrom through a slot 44 in element 10 and into engagement with trigger mechanism 14. Latch 42 may be an integral part of actuator member 12 or a separate part suitably mounted on the member. Actuator member 12 may be biased or urged against trigger mechanism 14 and away from element 10 towards utilization device 22 by a coil spring 46. Spring 46 may be positioned under compression within bore 38 and directed against a portion or face of member 10, such as within a bore 47 in member 12 as shown in FIG. 3. When latch 42 is released by trigger mechanism 14, actuator member 12 may be driven by spring 46 along bore 38 towards and against utilization means 22.

Figure 2:
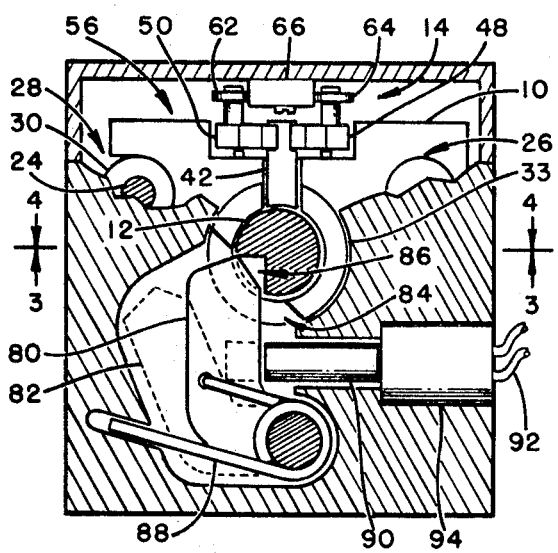
FIG. 2 is a partially cut away end view of the device of FIG. 1 showing details of portions of the device.
Figure 4:
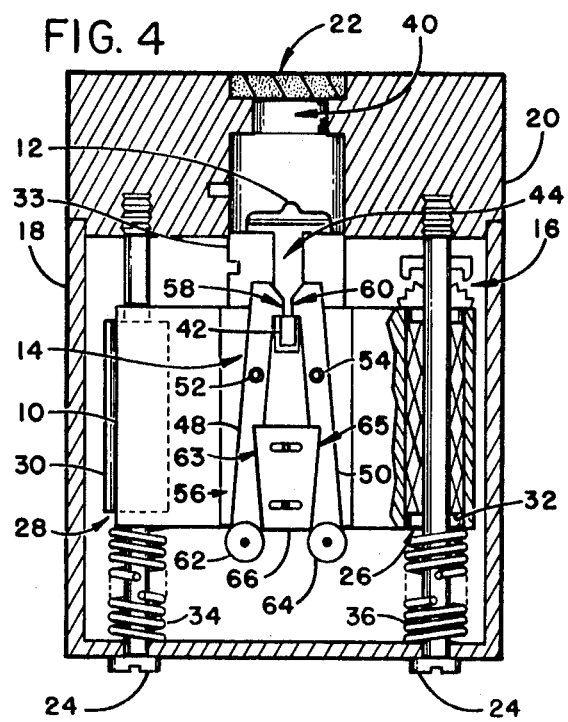
FIG. 4 is a partially cut away side view of the device of FIG. 2 taken along line 4-4 thereof.

Trigger mechanism 14 may include a pair of cooperating fingers or pawls 48 and 50, pivotally or rotatably mounted by pins 52 and 54 on a side face of element 10, such as in the removed portion or groove 56. In the latched or locked position, latch 42 of actuator member 12 may be "gripped" or held by ears or hooks 58 and 60 extending towards each other from pawls 48 and 50 respectively. Pawls 48 and 50 may be urged or biased in a cooperating position with ears 58 and 60 locked in engagement with latch 42 as shown in FIGS. 1 and 2, by a pair of rollers 62 and 64 mounted on a portion of pawls 48 and 50 extending beyond the pivoting pins 52 and 54 and bearing on opposite bearing or cam surfaces 63 and 65 of trigger block or cam 66. The width of trigger block 66 (i.e. the spacing between the cam surfaces 63 and 65 which determines the cam height) may be selected so as to maintain pawls 48 and 50 in the locked position against latch 42 regardless of the position of rollers 62 and 64 along the bearing surfaces of the block. When the rollers reach the end of the bearing surfaces and roll over the end of the block as shown in FIG. 4, that is the point where the cam surface spacing abruptly decreases or terminates, pawls 48 and 50 may rotate away from each other under the pressure of spring 46 and release latch 42.

Trigger block 66 may be mounted on an inner surface or sidewall of housing 18 or other framework by a suitable means. For applications where low-level $g$ forces are to be sensed, it may be desirable to mount trigger block 66 by suitable screws, rivets or other fasteners through elongated slots or openings such as slots 68 in FIG. 3 which may permit some lateral or sideways movement, i.e. floating action, of the block. This sideways or floating movement may offset any adverse effects from side loads or inaccuracies of surface finishes on the rollers or block as the rollers move along the bearing surface of the block. Further, it may also be desirable to form the bearing surfaces of trigger block 66 so as to converge in a direction away from base member 20, as shown. The convergence is shown in the drawings with an exaggerated angle for purposes of illustration, since in most applications, the angle of convergence may be at an angle of about 15 to 25 minutes on each side. Even such a small angle increases the sensitivity of the mechanism by permitting rollers 62 and 64 to roll more or less "downhill." In some applications it may be desirable to use a single locking arm or pawl with a roller moving along a fixed or immovable trigger block. Trigger block 66 may have any conventional cam surface shape or configuration which will provide the desired pawl movement.

The acceleration measuring device is shown in FIGS. 1, 3 and 5 in an initial position with acceleration-responsive element 10 urged against base member 20 by either springs 34 and 36 or spring 35 (see embodiment shown in FIG. 5). When the device is accelerated in the direction of the arrow in FIG. 1 at a sufficient rate to offset the bias of the springs and inertia forces, element 10 will be "set back" by the $g$ force along rods 24. As element 10 moves along rods 24, rollers 62 and 64 will roll along the bearing surfaces of trigger block 66. If the acceleration level continues for a sufficient time, rollers 62 and 64 may roll over the end of block 66, as shown in FIG. 4, causing pawls 48 and 50 to pivot away from each other due to the pressure applied by spring 46. When the pawls have pivoted a sufficient distance to release latch 42, actuator member 12 may be driven by spring 46 against utilization device 22.

Utilization device 22 is shown as a precussion-initiated explosive. This explosive may be used to directly initiate some desired response to the acceleration force measured such as the jettisoning of unwanted apparatus or equipment in a space vehicle approaching reentry or it may initiate an explosive train or power source to effect some other function. Utilization device 22 may also be some form of electrical circuit (not shown) which is completed or broken upon being struck by or making contact with member 12 or it may be any other type of device capable of performing or indicating upon being struck by member 12.

Additional provision may be made by the use of damping means 16 to assure continuance of acceleration for a predetermined time period before release of the actuator member and thus discriminate against extraneous shocks or movements. Damping means 16 may be any conventional integrating device or delay mechanism such as a conventional verge or other escapement as shown generally in FIGS. 3 and 4. A pinion gear 70 of an escapement may be driven by a rack gear 72 mounted on a side face of element 10 in a manner well known in the art. Other conventional damping means, such as damping fluids, etc. may also be used where appropriate. It will be apparent that the time period of this invention may be varied by adjusting the inertia of the verge of the escapement or by varying the length, shape or position of trigger block 66.

Such damping means will cause element 10 to move along rods 24 at some predetermined rate so that if an extraneous acceleration or force is applied to the device which does not continue for a sufficient time to permit element 10 to travel a required distance along rods 24, the springs 34 and 36 will return or reset element 10 to the initial position before rollers 62 and 64 reach the end of block 66 and release latch 42.

When using the acceleration measuring device for low-level $g$ force sensing, it may be desirable to provide a lubricant or a lubricating-type material to the face of latch 42 in contact with ears 58 and 60. A gold flashing has been found to be particularly good lubricating surface. Using a gold flashing on latch 42, a trigger block 66 with converging bearing surfaces and slots 68, as shown, and a constant force spiral spring 35 in place of coil springs 34 and 36, $g$ forces as low as about 1.6 $g$'s and continuing for about 0.3 seconds have been reliably and repeatably sensed by the present invention using a device of about 3 cubic inches in size. This same device withstood without releasing latch 42 a 200 $g$ acceleration force continuing for 1.7 milliseconds. By selecting the proper spring configuration and spring characteristics, acceleration forces of almost any level may be sensed.

It may be desirable to provide additional locking or safing means in certain applications where the device may be subjected to a number of acceleration forces which would prematurely actuate the device before the desired acceleration force is to be sensed. Such a locking function may be provided by the safing means shown in detail in FIG. 2. The safing means may include a lever 80 rotatably positioned in a slot 82 in base member 20 and urged into slots 84 and 86 in tubular guide 33 of element 10 and in actuator member 12 by spring 88. Thus, both element 10 and actuator member 12 are blocked or restrained from movement in any direction subject only to a force sufficient to shear lever 80. Lever 80 may be rotated out of slots 84 and 86 to the position shown by the dotted lines by a suitably driven rod or piston 90. Piston 90 may be driven upon application of a suitable signal to leads 92 by any conventional explosive mechanism or solenoid mechanism 94. Lever 80 may be maintained in the unlocked position by locking piston 90 in its extended position, by a releasable latching arrangement or by any other conventional means. Signal means (not shown) actuated by lever 80 may be provided to indicate the condition or position of the lever and consequently the condition of the acceleration measuring device.

The present invention may be used to measure a wide range of $g$ forces which may continue for varying periods of time. The $g$ force level of sensitivity may be readily selected and changed by selecting the proper type and level of spring bias without modifying the rest of the device. The device may be used to measure very low $g$ forces while discriminating against extraneous forces or shocks.

It will be understood that various changes in the details and arrangements of the parts, which have been described and illustrated in order to explain the nature of the invention, may be made by those skilled in the art within the principles and scope of the invention as expressed in the appended claims.

What we claim is:

1. An acceleration-sensitive actuator device comprising an acceleration-responsive element, means for urging said element in a first direction, an actuator member carried by said element having a latch extending therefrom, trigger means including first and second rotatably mounted fingers carried by said element and normally cooperating in complementary engagement with the latch of said actuator member for maintaining said actuator member in an initial position with respect to said acceleration-responsive element, and cam means having first complementary cam surfaces converging in a direction opposite said first direction of predetermined length with a cam height sufficient to hold said fingers in engagement with said latch and second complementary cam surfaces adjacent said first cam surfaces having a reduced cam height for releasing said fingers from engagement with said latch for maintaining said fingers in said cooperating relationship for a predetermined element movement and for releasing said fingers and freeing the actuator member for movement with respect to said element.

2. The device of claim 1 including means for fixing said cam means from movement in said first direction and for permitting movement in a direction lateral to said first direction as said fingers move along said cam means cam surfaces.

3. The device of claim 1 including an additional locking means engaged with said acceleration-responsive element and said actuator member for blocking movement thereof and means for disengaging said locking means from said element and said member.

* * * * *

UNITED STATES PATENT OFFICE
CERTIFICATE OF CORRECTION

Patent No. 3,581,577            Dated June 1, 1971

Inventor(s) George A. Ray Jr., et al.

It is certified that error appears in the above-identified patent and that said Letters Patent are hereby corrected as shown below:

Insert columns 5 and 6 as part of Letters Patent 3,581,577.

Signed and sealed this 9th day of April 1974.

(SEAL)
Attest:

EDWARD M. FLETCHER, JR.
Attesting Officer

C. MARSHALL DANN
Commissioner of Patents